Patented Oct. 31, 1939

2,178,521

UNITED STATES PATENT OFFICE 2,178,521

PROCESS OF PRODUCING COMPOUNDS OF THE PERYLENE SERIES

Heinrich Neresheimer and Anton Vilsmeier, Ludwigshafen-on-the-Rhine, Germany, assignors to General Aniline Works, Inc., New York, N. Y., a corporation of Delaware No Drawing. Application February 12, 1938, Serial No. 190,321. In Germany February 19, 1937

5 Claims. (Cl. 260—356)

The present invention relates to a process for producing compounds of the perylene series.

We have found that valuable condensation products of the perylene series can be obtained by heating a compound of the benzanthrone series obtained by acting on a benzanthrone with a halide of an acid, in the presence of acid condensing agents with high molecular unsaturated hydrocarbons or high-molecular alcohols, esters, mercaptans, ethers or thioethers. The term "high-molecular" means that the said compounds shall contain an aliphatic, aliphatic aromatic or cycloaliphatic radical having at least 6 carbon atoms.

The starting materials used for the present process are prepared by acting on a benzanthrone, for example on benzanthrone itself or on its hydroxyl, alkoxy, phenoxy, amino or alkyl derivatives, with the halide of any desired acid. By the said treatment at least two molecules of the benzanthrone are condensed giving a compound which is different from the starting material and characterized by a higher melting point and another chemical behavior. These compounds contain halogen, are not vattable and are converted by the action of agents which have simultaneously a saponifying and an oxidizing action, for example by heating with concentrated sulphuric acid, into vat dyestuffs of the dibenzanthrone or isodibenzanthrone series. Due to this behavior they are to be considered as derivatives of dibenzanthrene or isodibenzanthrene and are thus compounds of the perylene series. Products of the dibenzanthrene series are obtained if benzanthrones having a free Bz1-position are subjected to the said treatment. Products of the isodibenzanthrene series are obtained if the benzanthrone used as starting material contains in the Bz1-position a halogen atom or an organic radical of the general constitution —OR or —SR, wherein R means an alkyl, aralkyl or aryl group. Such compounds are for example described in the German Patents 487,870, 488,888, 488,889 and 511,946.

The reaction according to the present invention is carried out in the presence of condensing agents. As condensing agents there may serve with the best result the anhydrous halides of zinc. It is also possible to use boron trifluoride or its addition compounds, furthermore the anhydrous halides of aluminum, iron or tin. An addition of halogen hydracids is preferable in many cases. On the other hand, if the reaction takes place very readily, it is advisable to add small amounts of basic compounds. The reaction is generally carried out in the presence of a diluent. For this purpose there may serve an excess of one of the starting compounds. It is also possible to use organic diluents which do not participate in the reaction such as aromatic hydrocarbons or halogenbenzenes. In many cases the preparation of the starting materials and their reaction with the high-molecular compounds may be carried out in one working operation. For example, a suspension of Bz1-brombenzanthrone in dodecylbromide may be reacted at 145° C. with phosphorus tribromide and the brominated isodibenzanthrene thus formed may be further treated with zinc chloride while heating without separation of the intermediate product. In this manner a deep brown-red colored oil is obtained which dissolves readily in organic liquids giving a yellow coloration and a yellowish olive fluorescence.

In this manner there are generally speaking obtained vividly colored compounds which are usually very readily soluble in organic liquids. Their solutions have in part a vivid fluorescence so that they may be used with advantage for the coloring and/or rendering fluorescent of artificial resins of various kinds, of hydrocarbons, paraffin waxes, oils, waxes, fats, mineral oils, rubber and other natural and synthetic plastic masses as well as lacquers. They are also suitable as additions to nitrocellulose lacquers. Finally they may also be used for the preparation of other dyestuffs.

The following examples will further illustrate how the said invention may be carried out in practice but the invention is not restricted to these examples. The parts are by weight.

*Example 1*

A mixture of 10 parts of the substance obtainable from benzanthrone by boiling with benzoyl chloride according to the said German Patent No. 487,870, 100 parts of dodecyl bromide and 10 parts of zinc chloride is heated at about 200° C. for about 4 hours. After cooling, the mass is diluted with benzene and the insoluble residue is filtered off by suction and washed with benzene. The benzene is then evaporated off from the solution and the remaining deep red oil is washed several times with methanol. It dissolves very readily for example in paraffin oil giving a yellow coloration and an olive fluorescence.

If 10 parts of aluminum chloride are used as condensing agent instead of zinc chloride a product is obtained which dissolves for example in benzene giving a yellow coloration and a vivid bluish-olive fluorescence.

If dodecyl alcohol be used instead of dodecyl bromide, and hydrogen chloride be led through the reaction mixture, the same compound is obtained. By starting with compounds obtainable from benzanthrone with derivatives of benzoyl chloride, or with 6-chlorbenzanthrone, Bz1-chlorbenzanthrone, Bz1-hydroxybenzanthrone, Bz1-thiocresylbenzanthrone or other benzanthrone derivatives, substances having similar properties are obtained.

Instead of dodecyl alcohol, there may also be used other alcohols of high-molecular weight, as for example octodecyl alcohol, abietinol or mixtures of alcohols, as for example a mixture of dodecyl and tetradecyl alcohol. The olefines corresponding to the alcohols of high-molecular weight are also suitable for the reaction. High-molecular compounds which yield alcohols, alkyl halides or alkylenes under the reaction conditions may also be used as for example dodecyl ethers. In all cases there are obtained as the final products deep red oils having the properties described in paragraph 1 of this example.

*Example 2*

10 parts of the substance obtainable by the action of oxalyl chloride on Bz1-chlorbenzanthrone according to Example 3 of the said German Patent No. 488,889 and 10 parts of zinc chloride are introduced at 200° C. into 100 parts of a mixture of dodecyl and tetradecyl alcohols, hydrogen chloride then being led through the mixture until the initial material has been converted. The mixture is worked up in the manner described in the first paragraph of Example 1. A deep red oil is obtained which dissolves in paraffin oil giving a red-yellow coloration and a strong olive fluorescence.

*Example 3*

A mixture of 75 parts of dodecyl alcohol and 10 parts of the substance obtainable from benzanthrone by the action of oxalyl chloride according to Example 8 of the said German Patent No. 487,870 is first heated for about a quarter of an hour at 205° C. the color of the mixture thus changing from blue to brown. 10 parts of zinc chloride are then introduced and the whole stirred at about 200° C. while leading through dry hydrogen chloride until initial material is no longer detectable. The mixture is worked up in the manner described in the first paragraph of Example 1. A deep brown-red oil is obtained which has properties similar to those of the substance obtainable according to the first paragraph of Example 1.

*Example 4*

A mixture of 50 parts of dodecyl bromide, 10 parts of Bz1-brombenzanthrone and 18 parts of phosphorus tribromide is stirred at 145° C. until all brombenzanthrone has turned to a brown powder which is difficultly soluble in dodecylbromide. Unlike the starting material, a sample of this powder dissolves in concentrated sulphuric acid giving at gently heating a blue-green coloration; it is insoluble in alkaline hydrosulphite solution. If the sulphuric acid solution is heated at higher temperatures hydrobromic acid and sulphurous acid evolve. By pouring the solution into water dark flakes are obtained which yield a blue-violet vat and isodibenzanthrone-like violet dyeings. This behavior shows that Bz1-brombenzanthrone has been converted into a substance of the isodibenzanthrene series by means of phosphorus tribromide. Without separation of this first product the reaction mixture is heated at about 220° C. after the addition of 10 parts of zinc chloride and kept at this temperature until the vivid evolution of hydrogen bromide has ceased. The mass is allowed to cool, diluted with benzene and filtered off from undissolved ingredients. Then benzene is evaporated from the deep red colored filtrate and more easily volatile constitutents are distilled off. The residue thus formed is a deep brown-red oil which dissolves very readily in organic liquids, as for example benzine, paraffin oil, mineral oils and the like giving a yellow coloration and a very pure yellowish olive fluorescence.

A very similar product is obtained by starting from 6-Bz1-dibrombenzanthrone.

*Example 5*

A mixture of 30 parts of trichlorbenzene, 10 parts of Bz1-brombenzanthrone and 10 parts of thionylchloride is slowly heated at 190° C., the first green solution now turning brown. As conversion produce of Bz1-brombenzanthrone a reddish brown, difficultly soluble powder precipitates, the behavior of which to concentrated sulphuric acid is analogous to the first conversion product of Bz1-brombenzanthrone described in Example 4. 50 parts of dodecylbromide and 10 parts of zinc chloride are then added to the reaction product without separation of the first conversion product, heated to boiling and stirred at the boiling temperature, until the evolution of hydrogen bromide has ceased. The whole is allowed to cool and filtered off by suction from undissolved ingredients. After the addition of methanol to the remaining deep red filtrate a deep brown-red oil is obtained which dissolves very readily for example in paraffin oil giving a yellow coloration and an olive fluorescence.

If the first conversion product of Bz1-brombenzanthrone is filtered off by suction after heating at 190° C. by means of thionyl chloride and reacted with dodecylbromide in the presence of anhydrous iron chloride, instead of zinc chloride, there is obtained an end product which is practically identical with that described in the first paragraph of this example.

*Example 6*

The starting material for this example is prepared by heating Bz1-brombenzanthrone with stearic acid chloride in trichlorbenzene and mixing the deep red colored solution thus formed after cooling with methanol. A dark powder is obtained the behavior of which to hot concentrated sulphuric acid is analogous to that of the first conversion product of Bz1-brombenzanthrone described in the Examples 4 and 5. 2 parts of this conversion product are stirred with 4 parts of zinc chloride and 20 parts of octodecylene at from 220° to 230° C. until the reaction is completed. Then the whole is allowed to cool, diluted with benzene and filtered off by suction from undissolved ingredients. After evaporating the benzene and distilling off the more easily volatile constituents there is obtained a brown oil which is readily soluble in paraffin oil giving a reddish coloration and a powerful olive fluorescence.

*Example 7*

The starting material used in this example is prepared as follows:

A mixture of 10 parts of 6-aminobenzanthrone and 100 parts of benzoyl chloride is boiled under reflux for about 5 hours. After cooling it is diluted with benzene, filtered off by suction, washed with benzene and the reaction product obtained in the form of a dark brown powder is dried. It is soluble in concentrated sulphuric acid giving a deep brown coloration and is insoluble in alkaline hydrosulphite solution. When heating the sulphuric acid solution at higher temperatures the color of the solution turns to olive. After pouring it into water there are obtained dark flakes, which yield a violet vat and dyeings like dibenzanthrone.

3 parts of this first conversion product of 6-aminobenzanthrone are heated with 30 parts of dodecylbromide and 3 parts of zinc chloride at 220° C. and stirred at this temperature until the vivid evolution of hydrogen bromide has ceased. After cooling the mixture is worked up in the manner described in the foregoing example. A yellow-brown oil is obtained which is readily soluble for example in hydrocarbons giving a yellow coloration and a bluish olive fluorescence.

*Example 8*

The starting material for this example is prepared by causing 6 parts of oxalyl chloride to act on 10 parts of 6-methylbenzanthrone in 100 parts of nitrobenzene at 50° to 60° C. and filtering off the non-vatting condensation product which has been separated in the form of brown crystals and which may be converted in hot concentrated sulphuric acid into a vat dyestuff of the dibenzanthrone series.

A mixture of 3 parts of this product, 30 parts of dodecylbromide and 3 parts of zinc chloride is stirred at 220° C., until the vivid evolution of hydrogen bromide has ceased. The mass is then allowed to cool, diluted with benzene, filtered off from undissolved ingredients and worked up in the manner described in Example 6. A deep red oil is thus obtained which dissolves very readily in paraffin oil giving a yellow coloration and a vigorous, clear, olive fluorescence.

*Example 9*

The starting material for this example is obtained in an analogous manner as described in Example 8 by causing oxalylchloride to act on 2-chlorbenzanthrone. Its behavior to hot concentrated sulphuric acid is analogous to the product obtained according to the manner described in the foregoing example. It is reacted with dodecylbromide and zinc chloride and worked up as described in Example 8. The end product is obtained in the form of a red oil which is readily soluble in paraffin oil giving a yellow coloration and a vivid olive fluorescence.

Similar end products are obtained if 6- or 7-chlorbenzanthrone instead of 2-chlorbenzanthrone is subjected to the reaction described in the first paragraph of this example.

*Example 10*

2.5 parts of the starting material described in the first paragraph of Example 1, 25 parts of dodecylmercaptan and 5 parts of zinc chloride are heated at from 200° to 220° C., while hydrochloric acid is led through the mixture, until the reaction of the starting material is completed. Then the whole is allowed to cool, diluted with benzene, filtered off from undissolved ingredients, the benzoic filtrate is evaporated and the oleic residue thus formed is washed with methanol. There is obtained a deep red oil the coloration and fluorescence of which are practically identical with that of the dyestuff obtained according to the first paragraph of Example 1.

A product having almost similar properties is obtained by using didodecylsulfide instead of dodecylmercaptan.

What we claim is:

1. A process of producing compounds of the perylene series which comprises heating at from 180° to 300° C. a reaction product of a halide of an acid and a benzanthrone with a compound containing at least 6 carbon atoms and selected from the class consisting of aliphatic and cycloaliphatic unsaturated hydrocarbons, of aliphatic and cycloaliphatic alcohols, esters, mercaptans, ethers and thioethers in the presence of an acid condensing agent.

2. A process of producing compounds of the perylene series which comprises heating at from 180° to 300° C. a reaction product of a halide of an acid and a benzanthrone with a compound containing at least 6 carbon atoms and selected from the class consisting of aliphatic and cycloaliphatic unsaturated hydrocarbons, of aliphatic and cycloaliphatic alcohols, esters, mercaptans, ethers and thioethers in the presence of zinc chloride.

3. A process of producing a compound of the perylene series which comprises heating at from 180° to 300° C. a reaction product of a halide of an acid and a benzanthrone with an aliphatic alcohol containing at least 6 carbon atoms in the presence of hydrogen chloride and zinc chloride.

4. A process of producing compounds of the perylene series which comprises heating at from 180° to 300° C. a reaction product of a halide of an acid and a benzanthrone with an alkyl halide containing at least 6 carbon atoms in the presence of hydrogen chloride and zinc chloride.

5. A process of producing compounds of the perylene series which comprises heating at from 180° to 300° C. a reaction product of a halide of an acid and a benzanthrone with an unsaturated hydrocarbon containing at least 6 carbon atoms in the presence of hydrogen chloride and zinc chloride.

HEINRICH NERESHEIMER.
ANTON VILSMEIER.